United States Patent [19]
Dos Santos

[11] Patent Number: 4,561,537
[45] Date of Patent: Dec. 31, 1985

[54] PRESSURE DEVICE FOR CONVEYOR

[75] Inventor: Joseph A. Dos Santos, Winfield, Ala.

[73] Assignee: Continental Conveyor & Equipment Co., Inc., Winfield, Ala.

[21] Appl. No.: 524,056

[22] Filed: Aug. 17, 1983

[51] Int. Cl.[4] .................................. B65G 15/14
[52] U.S. Cl. .................................. 198/628
[58] Field of Search ............... 198/628, 626, 604, 607, 198/826

[56] References Cited

U.S. PATENT DOCUMENTS

| | | | |
|---|---|---|---|
| 2,254,860 | 9/1941 | Rose | 198/628 |
| 2,966,254 | 12/1960 | Kaiser | 198/628 |
| 2,987,166 | 6/1961 | Gray | 198/628 |

Primary Examiner—Joseph E. Valenza
Assistant Examiner—Kyle E. Shane
Attorney, Agent, or Firm—Fred K. Lacher; J. Januszkiewicz

[57] ABSTRACT

A high angle conveying apparatus including a conveyor belt and a cover belt trained for movement in endless paths of travel. An improved roller assembly is provided for providing fully equalized pressure to the back face of the cover belt for improved performance.

2 Claims, 13 Drawing Figures

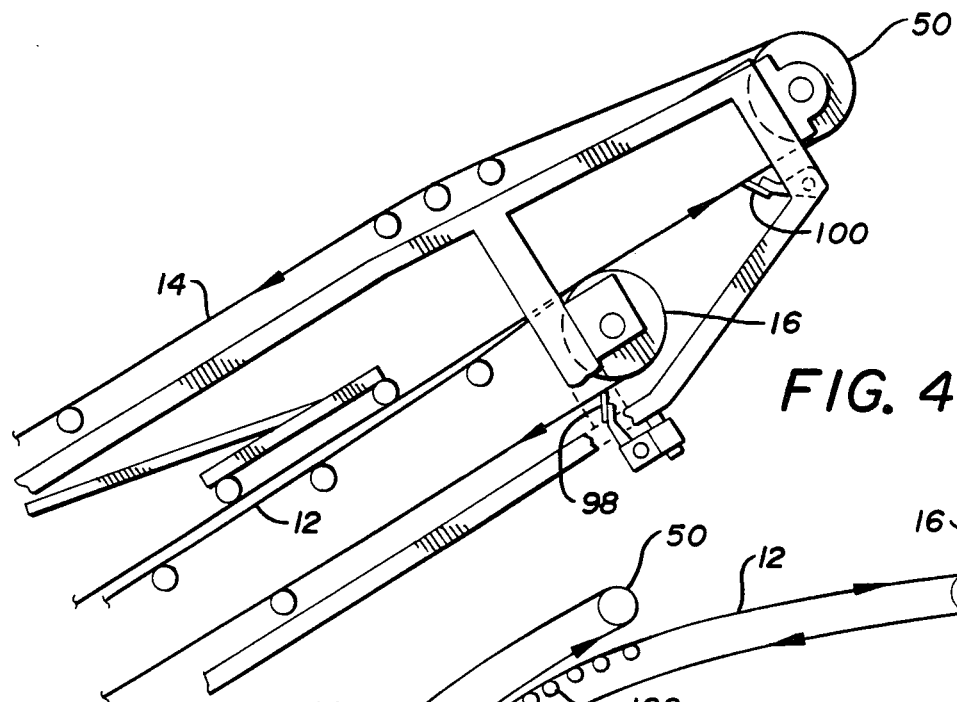
FIG. 4
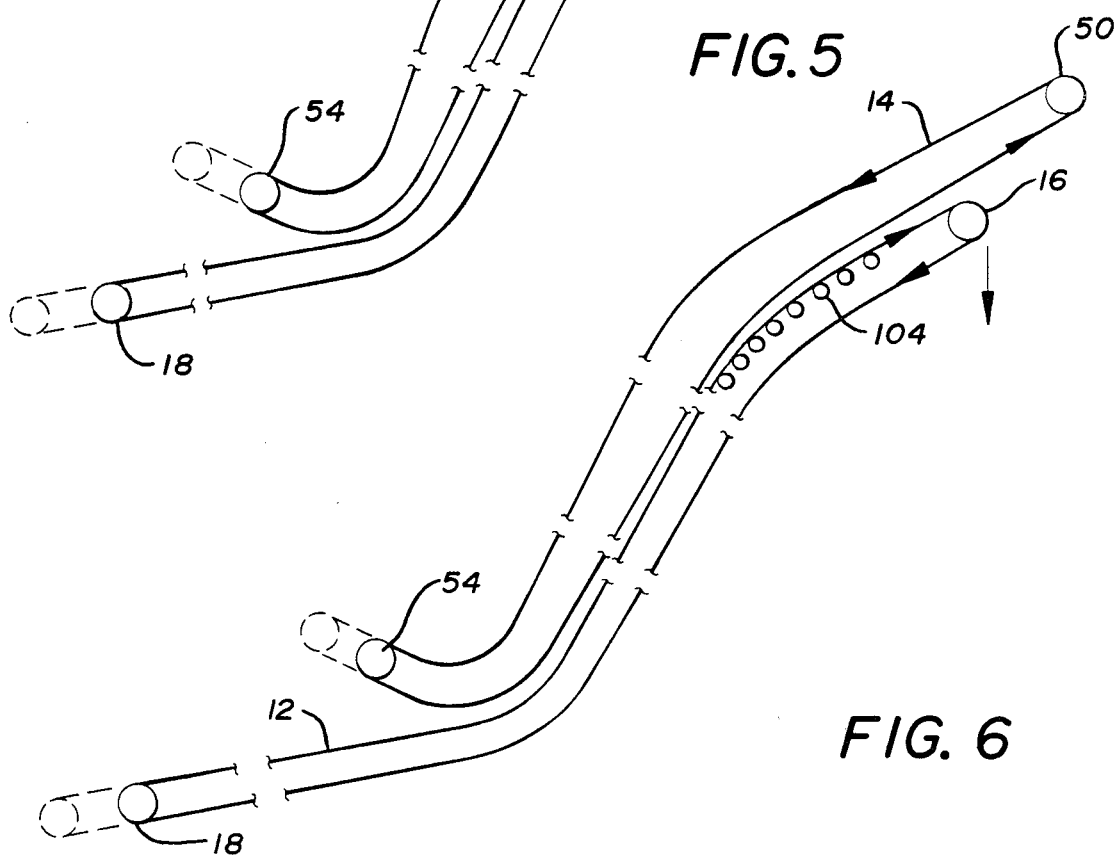
FIG. 5
FIG. 6

PRESSURE DEVICE FOR CONVEYOR

BACKGROUND OF THE INVENTION

Conventional conveyor belts offer an economical method for transporting bulk material at certain inclined angles ranging from a low of 7° for fine and somewhat lubricious material such as soda ash brickets, to a high of 30° for cinder concrete and ground phosphate fertilizers. Typical recommended inclination angles for open-pit mine products such as excavated earth including anthracite coal, bituminous coal, lignite and crushed rock, vary from 15° to 22° with respective angles of repose from 29° to 44°.

The conventional conveyor is often the most economical, reliable and safe means for transporting such bulk materials. There are, however, many cases which strongly warrant an increase in conveying angles.

In a static case, a cohesionless material on a rubber conveyor belt will begin to slide back when the incline angle of the belt surface just exceeds the angle of internal friction of the material or the friction angle of the material to belt surface interface, whichever is smaller. The angle of internal friction is equal to the angle of repose of such materials.

Both the angle of repose and the friction angle for bulk materials on rubber will vary from one material to the next and will be affected, even for the same type of material, by the maximum lump size, the lump size distribution, the orientation of the conveyor cross-section, and the shape that the particles or lumps take as a result of the reduction process, i.e., blasting and the varying degrees and methods of crushing.

The recommended conveying angles are in general far below the recommended friction angles. This is due to the dynamics induced in a moving belt conveyor, which result in relative motion between adjacent particles or lumps of the bulk material and between the material and carrying surface of the conveyor belt.

Various prior art approaches have been disclosed in an effort to convey particular material at high angles. All of these prior art disclosures are directed to solving the problem of conveying bulk material at steep angles and high conveying rates efficiently and economically. None, however, have received commercial acceptance for one reason or another.

In designing such a system and improving the prior art devices to a structure of commercial acceptability the conveyor geometry must lend itself to support and extend along a straight incline. The conveyor surfaces must lend themselves to continuous cleaning and easy repair.

The prior art devices include bucket-elevators, flat belts with corrugated rubber sidewalls and cross-cleats, and troughed belts with fins, all of which may be used to convey bulk materials along steep inclines. Presently these methods are typically expensive, of limited capacity, and are unable to completely discharge sticky material. Further, they do not lend themselves to continuous cleaning by belt scrapers or plows because of the cleats, fins, and the like.

The problems as stated above have been solved, at least in theory, in the past by the sandwich belt conveyors consisting of a troughed conveyor belt working in association with a cover or hugging belt. Hugging pressure is required to develop sufficient friction between bulk material and belt surface so that the bulk material will not slide back when conveyed at steep angles.

Various methods have been used or suggested to provide the required hugging pressure. These include the use of a heavy cover belt whose normal component of its linear weight provides the hugging force necessary. This method is disclosed in U.S. Pat. No. 3,618,748 to Suloff.

This method provides uneconomical solutions on conveying angles approaching 45°. The normal component of the belt weight decreases with increasing conveying angle but the hugging pressure requirements increase. Very heavy belts are therefore required and such belts are expensive to manufacture. The support structure also becomes expensive because of the additional loading by the heavy cover belt.

Another method for providing the required hugging pressure is in the use of pressing rolls which, when pressed onto an ordinary cover belt, provides the hugging force necessary. This method is disclosed in USSR Pat. No. 502,803 to Usov.

This method described a concept of the past which included two and four individually pressed rubber tires at each cross-section of the conveyor with wide spacing along the conveyor length. Pressing concepts of the past did not distribute the load sufficiently over the conveyor belt surface and this resulted in load concentrations, localized wear and accelerated breakdowns of conveyor components as well as in the loss of hugging pressure between the widely spaced rolls along the conveyor length. This resulted in material spillage. Cover belt tension could not be increased to offset these problems because of the nature of the conveyor loading area.

Yet another method for providing hugging pressure is in the use of two belts which resist lateral bending and are pressed together at the edges by staggering edge rolls. In this manner the lateral flexural stiffness of the belt must be such that when the conveyed material enters the sandwich and pries them apart in the middle region the resistance to prying provides the hugging pressure necessary to prevent the material from sliding back under the forces of gravity as permitted by overcoming the frictional coefficient. This method is described in U.S. Pat. No. 3,982,626 to Mehta and German Patent No. 1,259,238 to Pelzer.

This third method is for conveying materials vertically only. Further, it has capacity limitations. At capacities which are high, very wide belts are required. The lateral bending stiffness to provide the required prying resistance in this hugging pressure must be very high. Because such belts must be very thick with many plies of lateral reinforcements, such belts become very expensive to manufacture. In addition, such stiff belts will not sit in a troughed configuration when, at the loading regions, it must behave as an ordinary troughed conveyor. Practical belt widths are limited to approximately 36" and conveying capacity is less than a thousand tons per hour even when conveying very dense material at relatively high speeds.

The last method for providing the required hugging pressure is in the use of two ordinary belts at low-elastic modulus and the judicious selection of a conveyor profile geometry so that one belt is supported by troughing idlers in a convex vertical curve. The other belt provides the hugging pressure necessary by the radial pressure and by virtue of its belt tension and the profile geometry when formed in a C-shaped or snake-like configuration. This method is described in U.S. Pat. Nos. 2,642,178 and 3,805,946 to Naylor and Yateman, respectively, and the Report "Evolution of Sandwich Belt High Angle Conveyors" by Joseph A. Dos Santos and Earl M. Frizzell.

With this method the required hugging pressure is derived by the judicious selection of a conveying profile gemoetry which will exploit the inherent belt tension to produce a radial hugging pressure which will prevent sliding of the material in the sandwich when conveying at high angles. The nature of the loading area permits the selection of the belt tension in the region which is consistent with the selected conveyor profile and the required radial pressure. The C-shaped loop belt elevator as described in U.S. patent to Naylor and Yateman, referred to above, includes structures embodying this method for concept. This has no practical capacity limitations. The C-shaped geometry, however, is impractical for conveying material along a straight line path of predetermined incline.

An extension of the concept referred to in the immediately preceeding paragraph is the snake sandwich conveyor described in the aforementioned Report. This development has solved some of the problems of geometrical conformance by introducing an inflection to the conveyor belt. By inflection it is meant curvature reversal points along the conveyor profile and alternately carrying the top and bottom belts on troughing idlers along a vertical convex curve, with the belt providing the radial pressure by virtue of its belt tension.

The snake sandwich conveyor concept permits conformance to any vertical conveying geometry by the introduction of the inflexion points as required along the length. A correctly conforming geometry with loading and discharging at pre-specified locations is determined by trial and error. Once such a conveyor is installed, the profile geometry cannot be altered appreciably and such a conveyor cannot be extended or shortened. Such conveyors are impractical for applications requiring a high degree of mobility and flexibility.

SUMMARY OF THE INVENTION

The present invention solves the problems set forth in the methods of the above noted descriptions by the introduction, among other things, of area whereas the conveying and cover, or hugging, belts move from the transition curves to the linear path and vice versa, and by the selective employment of upwardly directed and downwardly directed troughed idler rolls, and by the use of an essentially fully equalized hugging pressure device to softly and evenly distribute hugging pressure onto the tensioned cover belt along the straight conveyor profile, and by the use of a loading and transition profile of the conveying and cover belts which, when acted upon by pressure device, will spread out the pressure along the length and across the width of the belts to enhance the lifting performance of the fully equalized hugging pressure device.

Many possible combinations of loading-transition, loading and discharge zone profiles, as shown and described in this application, make this system especially adaptable to applications requiring a high degree of mobility and flexibility.

In open pit mine applications, a high angle conveying system such as that disclosed herein offers many advantages over the traditional truck haulage system, including superior energy efficiency. Trucks must transport their own dead load in addition to the pay load. Dead load can range up to 45% of the total gross hauled weight, even when the truck is loaded to capacity. In the present high angle conveyor, the energy goes towards elevating material with only a very small amount lost to idler bearing friction.

The present system is less dependent on petroleum products. Electrical power for a high angle conveyor system is increasingly generated by coal, hydro, and nuclear power. The dependency on imported oil and the prospect of diesel fuel rationing need not concern the mine planner in the present invention.

The present invention is also less sensitive to inflation. A high angle conveyor will have a longer life and much lower maintenance costs when compared to trucks which are replaced every six to eight years.

In many applications the presently disclosed system may require less total excavation. High angle conveyors may be supported along any stable slope. Total excavation is, therefore, determined by geotechnical stability considerations and not by the 8% to 10% maximum slope requirements of the truck haulage ramps. This also makes a high angle conveyor system superior to a conventional conveyor system with their maximum slope of about 27%.

Less haulage road maintenance is required when using the present invention. A high angle conveyor system requires only small access roads for maintenance of vehicles. This greatly reduces the need for large maintenance crews, equipment fleets and associated costs required for large truck haulage ramps.

The present high angle sandwich belt approach to high angle conveying also offers many advantages over other systems described herein such as a simplicity of design approach. The use of all conventional conveyor hardware means interchangability of components, fast delivery of replacement parts, high availability, low maintenance costs.

The present system is virtually unlimited in capacity. The use of conventional conveyor components permits high conveying speeds. Available belts and hardware to ten feet wide make possible capacities well in excess of 10,000 tons per hour.

High lifts and high conveying angles are also permitted due to the present invention. Lifts to 350 feet are possible with standard fabric belts, and single run lifts to approximately 900 feet are possible with steel cord belts. High angles in excess of 45° are possible without excessive wear because of a soft, floating, pressing mechanism.

The present invention also permits flexibility in planning and in operation. The herein-disclosed sandwich belt conveyor lends itself to a multi-module conveying system using self-contained units as well as to a single run system using an externally anchored, high angle conveyor. In either case, a conveyor unit may be shortened or lengthened or the conveying angle may be altered according to the requirements of a new location. High angle conveying modules may be mounted on rails, rubber tires or crawler type transporters or may be equipped with walking feet for optimal mobility.

With the present invention belts are easily cleaned and quickly repaired. Smooth surfaced belts allow continuous cleaning by belt scrapers or plows. This is especially important in handling wet and sticky material. Smooth surfaced belts present no obstructions to quick repair of a damaged belt by hot or cold vulcanizing. Quick repair means less costly downtime.

Lastly, dust-free operation results from the present invention. During operation, the material is sealed between the carrying and cover belts. Well centered loading and ample belt edge distance result in no spillage along the conveyor length. Dust control efforts need only be at transfer points.

It is, therefore, an object of the present invention to convey particular materials at high angles efficiently and economically with a sandwich belt conveyor including improved torsion apparatus to apply fully equalized pressure to the back face of the cover belt. This and other objects of the present invention will become be apparent when reading the following detailed description of the application in association with the appended claims and drawings.

DESCRIPTION OF THE DRAWINGS

FIGS. 4 to 6 are enlarged side elevational views of the top or material discharge zone of the primary embodiment of the invention and two alternate embodiments thereof.

DETAILED DESCRIPTION OF THE INVENTION

General Configuration

Figure 1:
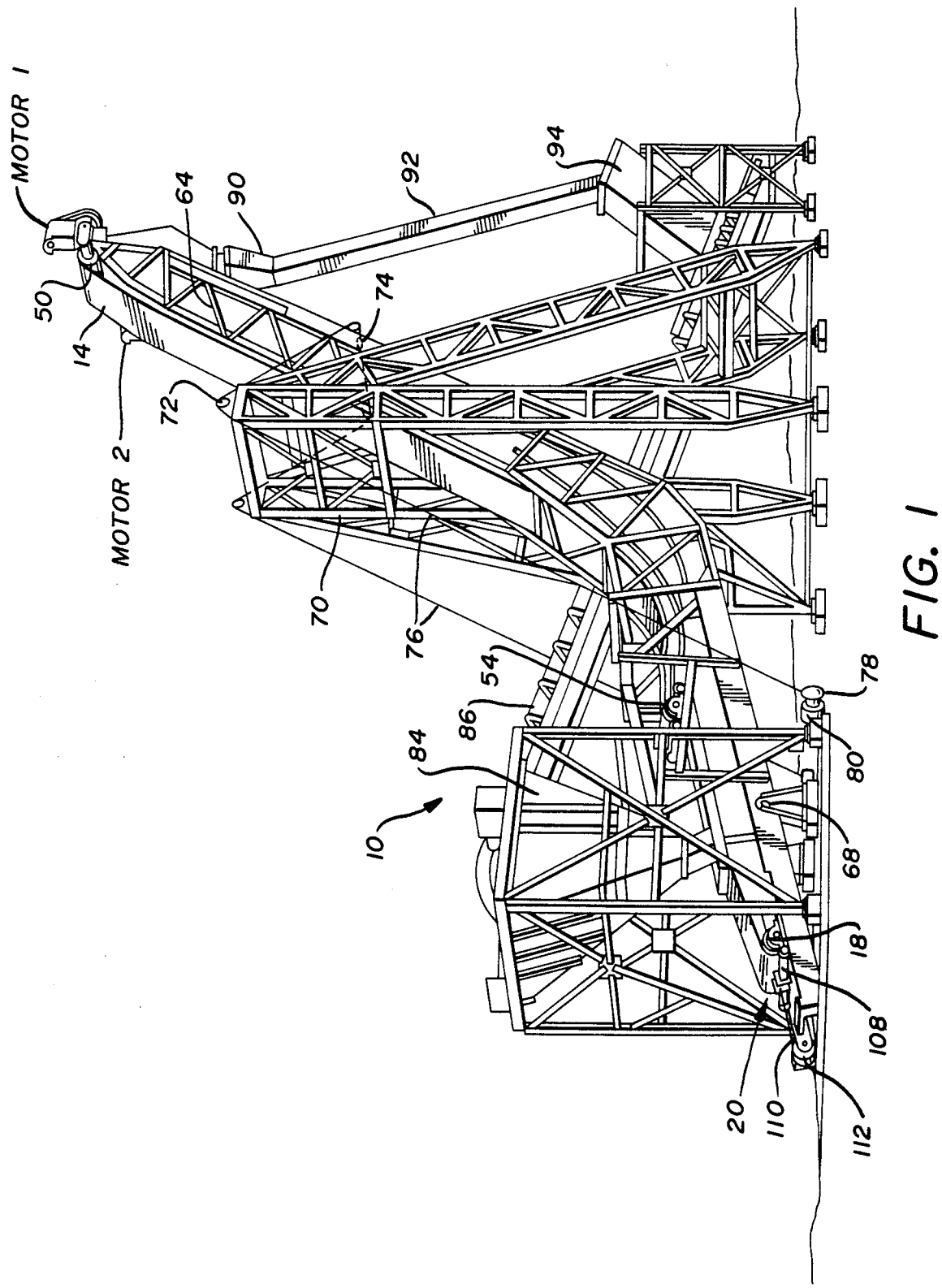
FIG. 1 is a perspective view of a high angle conveyor constructed in accordance with the teachings of the present invention.
Figure 2:
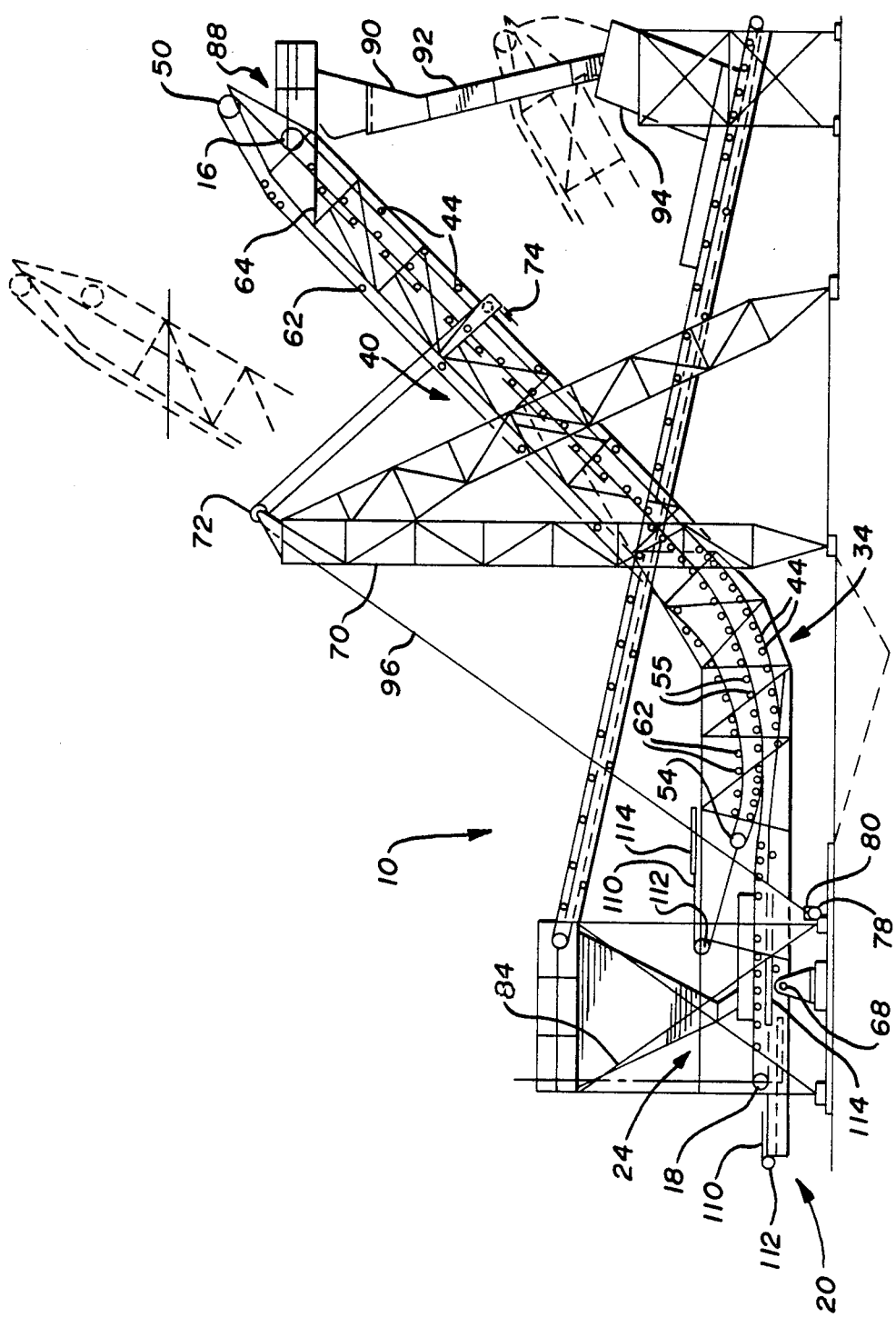
FIG. 2 is a side elevational view of the curved and straight line portions of the high angle conveyor shown in FIG. 1 and also showing, in phantom lines, the conveyor at different angles of orientation.
Figure 3:
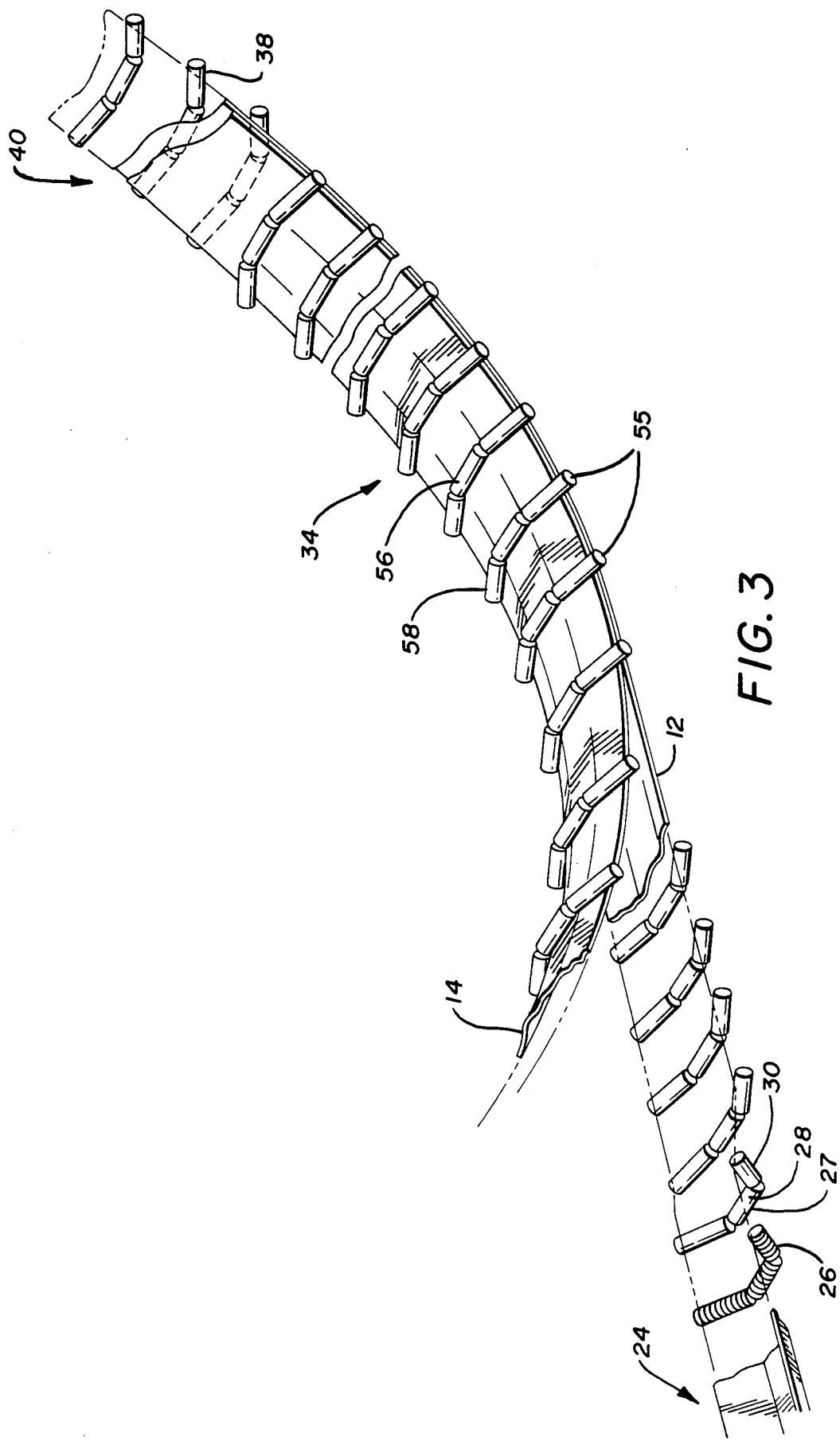
FIG. 3 is a perspective illustration of the transitional portion of the high angle conveyor showing the transition zone of the belt with parts removed for greater clarity.

Shown particularly in FIGS. 1, 2 and 3 is the general configuration of the primary embodiment of the sandwich belt high angle conveyor apparatus 10 of the present invention. The device includes a lower conveyor belt 12 and a hugging or cover belt 14 cooperatively arranged in endless configurations to effect the conveying of the material at high angles. The lower conveyor belt 12 is supported at extreme ends by an upper drive roll 16 and by an automatic take-up roll 18 and assembly 20 at its lower end. Support is provided at the lower end on loading zone 24 by a plurality, four in the disclosed embodiment, impact idler rolls 26 constructed of a plurality of stacked resilient disks to present surfaces have the capacity to withstand the impact of material dropped onto the belt for being conveyed. On opposite sides of the impact rolls are idler assemblies consisting of horizontal idler rolls 28 to support central section of the belt with pairs of angled side idler rolls 30 upturned at equal angles of about 35° from the axis of the horizontal rolls. On opposite sides of these rolls, upstream and downstream thereof, are further idler assemblies comprised of horizontal rolls and pairs of side rolls at shallower angles of about 20°. Between these idler assemblies may be additional assemblies at intermediate angles to provide a smoother transition of the belt as it assumes varying degrees of upwardly troughed configuration. The purpose of these idler rolls is to support the materials being fed and to hold the belt at predetermined and varying troughing depth as it moves along its path of travel. No supporting idler rolls are provided beneath the conveyor belt in the curved transitional zone 34, the shape of the lower conveyor belt 12 being dictated by idler rolls, to be later described, supporting the upper cover belt 14 and the material being conveyed.

Continuing with the description of the support for the lower conveyor belt 12, a grouping of idler rolls in troughed idler roll assemblies 36 are provided along the straight line path or lifting zone 40 of the lower conveyor belt to an extent to a point adjacent the upper drive pulley 16. These idler roll assemblies 36 are equally spaced along the path of belt travel and are constructed each with a horizontal axis, central idler roll 38 and angled pairs of side idler rolls 42 extending at about 35° angles as shown in FIG. 3.

On the reverse path of travel of the conveyor belt 12, there are provided a group of idler rolls 44 rotatable around horizontal axes to permit the belt to move readily, out of interfering contact with the lower face of the uppermost material carrying region of the conveyor belt. These idler rolls 44 are closely spaced at the curved transitional zone 34 contacting the upper or interior surface of the belt 12. On either side, the return run of the conveyor belt 12 is supported by more distantly spaced idlers 44 on the external or lower surface of the belt.

The upper or hugging or cover belt 14 like the lower or conveyor belt 12, is provided at its opposite ends with pulleys, the upper pulley 50 being driven and the lower pulley 52, including an automatic take-up roll assembly 54. The central portion of the belt, in the curved transitional zone 34 includes a group of inverted idler roll assemblies comprising central horizontal idler rolls 56 and side idler rolls 58 angled downwardly at about 20°. These idler rolls 56,58 tend to curve the upper cover belt 14 into a trapezoid configuration through its arcuate path of travel. When no material is present to be conveyed these downwardly troughed idler rolls 56 and 58 will trough the lower conveyor belt 12 in like configuration.

The straight-line portion of the upper conveyor belt 12 is supported by sets of the fully equalized hugging pressure devices to be described later.

During its return run, the upper cover belt 14 is held into a position to preclude contact with the cover belt during its load carrying run by groups of horizontal axis idler rolls 62. The idler rolls 62 are straight, not troughed, and are more closely spaced at the curved zones than at the straight line zones. The idler rolls 44 and 62 guiding the return of the upper cover belt 14, as well as the lower conveyor belt 12, assist in maintaining the proper tension in the belts. All of the idler rolls 26,27,28,30,36,38,42,44,55,56,58,62 are maintained in proper relationship to each other by suitable framing members 64.

As shown in the drawings, the framing members 64 are positioned around the conveyor belt 12 and at least the hugging portion of the cover belt 14. This provides a unitary structure with the framing members 64 of the curved transitional zone 34 connected to the framing members of the straight loading zone 24 and the straight inclined lifting zone 40. The resulting self-contained supporting framework not only supports the belt load through the idler rolls 26,27,28,30,36,38,42,44,55,56,58,62 and rollers 126 but also provides a structure for resisting the belt tension forces in the conveyor belt 12 and cover belt 14 from the one end to the other end through the curved transitional zone 34.

INFLECTION AREAS

As can be seen in the drawings with particular reference to FIGS. 2 and 3, the troughed nature of the idler roll assemblies through the curved transitional zone 34 and immediately prior thereto and immediately therefollowing are of such configuration and design that the lower conveyor belt 12 is upwardly troughed when approaching the area beginning the curved transitional zone. Conversely, the upper idler rolls 56,58 will downwardly trough the upper cover belt 14 at this same area. As a result, the lower conveyor belt 12 when beginning its contact with the upper cover belt 14 will move from troughing support from an upwardly directed to a downwardly directed troughed configuration. This is more readily seen when the belts 12 and 14 are moved in an unloaded configuration but exists to a lesser degree when material is being transported. At a minimum, the forces of the upper idler rolls 56,58 urge this reversal of lower conveyor belt configuration 12. Because of this, the conveyor belt 12 will go through an inflection area where the straight loading zone 24 meets the curved transitional zone 34.

The forces applied to the belts 12 and 14 at this inflection area permit the transition from the mode where the material is being conveyed in a straight path of travel, in an essentially conventional manner approaching the curved transitional zone 34 to a mode where conveying is effected by a sandwich of conveyor and cover belts through a curved path.

A similar type situation occurs at the end of the curved transitional zone 34 wherein the downwardly troughed upper idler roll assemblies 56,58 cease and the lower upwardly troughed idler rolls 36 begin to directly support the weight of the belts 12,14 and conveyed material. Here again it can be seen, with particular reference to the unloaded state, that the lower conveyor belt 12 and, in addition thereto, the upper cover belt 14 would jointly move from a downwardly extending trough configuration to an upwardly extending trough configuration, hence creating this second inflection area.

It has been found that the curved transitional zone 34 performs more efficiently in association with the straight zones 24 and 40 before and after, if the curve in cross section not be of a constant radius of curvature. Hence, the lower portion of the curved transitional zone 34 is preferably at a radius of curvature of about 35 feet decreasing to a radius of curvature of about 30 feet at the output end. It has also been found that the lower idler roll assemblies 28,30 immediately prior to the curved transitional zone 34 be dropped from the preceding straight line zone configuration 24 whereby the last three idler roll assemblies 28,30 prior to the curved transitional zone 34 effect a radius of curvature of about 30 feet. Similarly, the lower idler rolls 36 at the beginning of the straight lifting zone 40 following the curved transitional zone have been found to be more effective when they follow a curve with about a 35 foot radius of curvature. The dropping of the idler rolls 28, 30 and 36 in the straight loading and lifting zones 24 and 40 permits the smooth conformance of the conveyor belt 12 with the curvature of the cover belt 14 at the beginning and end of the curved transitional zone 34. Thus the idler roll rolls 28, 30 and 36 in the straight line loading and lifting zones 24 and 40 immediately before or after the curved transitional zone 34 trace a curved profile with a radius of curvature therebeneath while the curved transitional zone has a radius of curvature thereabove.

SUPPORT & VARIABLE ANGLES

As can be seen with particular reference to FIGS. 1 and 2, the conveyor belt 12, idler rolls 26,28,30,36,38 and supporting framework are maintained in an orientation during operation to provide the desired high-angle conveying. In the primary embodiment, a pivot head 68 is mounted in a concrete structure to pivotally support the entire machine through its framing members 64. A truss structure 70 spans the conveyor at a central location and it is provided with two pulleys 72 at its upper segment to support a cable 76 coupling pulleys 74 rotationally coupled to the framing members 64 of the conveyor. The end of the cable 76 remote from the winch 78 is secured to the ground adjacent the pivot head 68. The winch 78 and a motor 80 effect the angle variation. Activation of the winch 78 can reel in or reel out additional cable 76 to raise or lower the upper end of the conveyor through the pulley arrangement. This in turn will increase or decrease the angle of the conveyor belt 12, principally at its elongated linear stretch. The particular structure as shown in the primary embodiment is adapted to modify the angle of incline from about 30 degrees to about 60 degrees. Note the phantom lines of FIG. 2. It should be noted, however, that because of the particular configuration and geometry of the system there is effectively no limit to the angle that material can be conveyed up to a full 90 degrees. Further, for the same reasons, there is no limit to the length that the linear lifting zone of the conveyor can life materials in open pit mining sites.

It is thought that if any limit exists to the angle or length of such a conveying system, the limiting factor might be the stretch or resilience of the belting material employed.

Additional support structures and configurations are also contemplated and are disclosed subsequently herein with reference to the descriptions of FIGS. 16, 17 and 18.

There are various reasons for providing the variable angle of a high angle conveyor. In certain open pit mine sites, it is possible for the configurations of the slopes to vary over time as the mining proceeds. As a result, on site variations in conveyor angle might be dictated by its utilization at the site. Further, the varying angle permits the high angle conveyor to be utilized as an experimental bread board for determining reactions of the materials and the lifting capabilities of the conveying apparatus to varying conditions of the conveyor. As a result of the operation in an experimental mode, idler rolls may be adjusted, tensions modified or other parameters varied for carrying out tests and experiments at varying angles.

MATERIAL RECIRCULATION

As a further aid to the utilization of the high angle conveyor as a bread board for further experimentation, the primary embodiment is shown with a hopper 84 for discharging material to the lower conveyor belt 12 at its lower end at the loading zone 24 above the region of the impact idler rolls 26. Such a hopper 84 might well be utilized in the mine site for the reception of materials from a back hoe, bucket wheel excavator, drag line or other material conveying machine. In the present embodiment, however, the hopper 84 is fed from a fixed conveyor belt 86 of the conventional variety, but at an angle to convey it from beneath the upper end or discharge zone 88 of the conveyor apparatus 10 to the upper mouth of the hopper.

The upper end of the conveyor apparatus 10 is provided with a funnel like member 90 to receive the conveyed output from the conveyor belt 12. As enclosed chute 92 connects the funnel through a second hopper 94 at the lower end of the return conveyor belt 86. The chute 92 is preferably closed to minimize environmental contamination from the active movement of the materials being conveyed. In this manner, the material being conveyed will be dropped through the funnel member 90, through chute 92 to the second hopper 94 and gravity fed to the lower end of the fixed conveyor belt 86 for being conveyed to the first hopper 84 above the impact idler rolls 26 supporting the conveyor belt 12 at the loading zone 24. These recirculating structures are not mounted for angle variation through the motor 80 which modifies the angle of the conveyor assembly.

MATERIAL EXIT CONFIGURATION

Shown in FIGS. 4, 5 and 6 are alternate configurations for the material exit end or discharge zone 88 at the upper portion of the conveying system. In the FIG. 4 embodiment, which is the primary embodiment shown in FIGS. 1 and 2, the upper driven pulley 50 and cover belt 14 extend to a distance beyond the lower drive roll 16 and conveyor belt 12. In this manner the upper cover belt 14 extends for a distance beyond the lower conveyor belt 12, both in a continuation of the straight line configuration. It has been found that this orientation permits the more efficient movement of the conveyed material to beyond the point of contact between the conveyor belt 12 and hugging cover belt 14 to more efficiently permit the gravity movement of the conveyed material from the conveying system. Also in this regard, in FIG. 4 are shown scraper elements 98 and 100 for both the upper conveyor belt 12 and lower cover belt 14 in close proximity to the discharge zone 88 where the conveyed material is to be gravity dropped. The scraper elements 98 and 100 are shown as spring biased members preferably of the type manufactured by Hosch Incorporated of Pittsburgh, PA. The configuration and spring loading orientation is such that no conveyed material should return to the lower portion of the conveyor assembly, but rather than all conveyed material either gravity drop immediately or after being scraped by the scraper elements 98,100.

The schematic illustrations of the FIGS. 5 and 6 embodiments shown alternate embodiment material exit configurations at the discharge zone 88. In the FIG. 5 embodiment, the conveyor belt 12 is extended beyond the upper cover belt 14.

Additional trough idler rolls 102 support the conveyor belt 12 in a further curved configuration. In this manner, the conveyor belt 12 extending beyond its point of contact with the hugging cover belt 14 effectively acts as a conventional conveyor belt supported by additional spaced troughed idler rolls not shown but extending to the upper drive roll 16 to any desired distance. In this manner, the conveyed material may be transported to a further remote location if the configuration of the excavation site so warrants.

In this embodiment the cover belt 14 must be maintained in supporting contact with the conveyor belt 12 at least until the conveyor belt has reduced its angle of rise to an angle where material may be conveyed in the conventional manner, i.e., about 22° or less but preferably 15° or less. Pressure should be applied to the upper surface of the cover belt 14 in the area of contact with the conveyor belt 12 in this area as by the device to be later described.

In FIG. 6 there is shown another alternate embodiment similar to the configurations of FIGS. 4 and 5 in that the lower conveyor belt 12 assumes a curved path beyond the straight line conveying portion. Additional troughed idler rolls 104 support the conveyor belt 12 in a curved orientation. Similarly, the hugging or cover belt 14 follows such curve but extends beyond the lower conveyor belt for additional latitude as dictated by the particulars of the excavation site.

Additional hugging pressure may be provided to the upper surface of the cover belt 14 through this curved zone by devices to be later described.

In either of these secondary embodiments, as well as in the primary embodiment, the loading zone 24 may be of any desired length. In this manner the impact idler rolls 26 for the reception of material to be conveyed could be a great distance from the curved transitional zone 34 for greater latitude of apparatus design to accommodate a wide range of mine sites.

In any of these secondary embodiments of FIGS. 5 or 6, as well as in the primary FIG. 4 embodiment, scraper elements 98 and 100 would preferable be utilized to preclude conveyed material from returning and being conveyed again.

AUTOMATIC TAKE-UP ROLL ASSEMBLY

As can be seen in FIGS. 1 and 2, the take-up roll 18 and the lower pulley 52 for conveyor belt 12 and cover belt 14 are mounted at their axial ends with yokes 108 which are in turn mounted on cables 110. The cables 110 have their directions reversed through idler pulleys 112 mounted on the framing members 64 with the cables 110 being mounted on air cylinders 114. The air cylinders 114 are of the conventional variety whereby a preset pressure may be automatically set by the operator to a predetermined amount so that any variations of conditions such as temperature, humidity, load being carried, would not vary the belt strength. Without such automatic take-up roll assembly the performance of the system would be modified through the change in the belt tension. But with the pre-set pressure in each of the cylinders 114, independent of the other, a predetermined pressure may be set for each belt tension. In the event that the pressure would vary, each of the cylinders 114 would automatically act to move its associated pulley 112 and support roll to thereby return the tension in its associated belt to the predetermined value. The axial ends of each of these pulleys 18 and 54 is positioned in slots on framing members 64 of the support structure of the conveyor for insuring straight line motion of the pulleys when adjustments are automatically made by the air cylinders.

AUTOMATIC SPEED/TENSION PROPORTIONING ASSEMBLY

Figure 7:
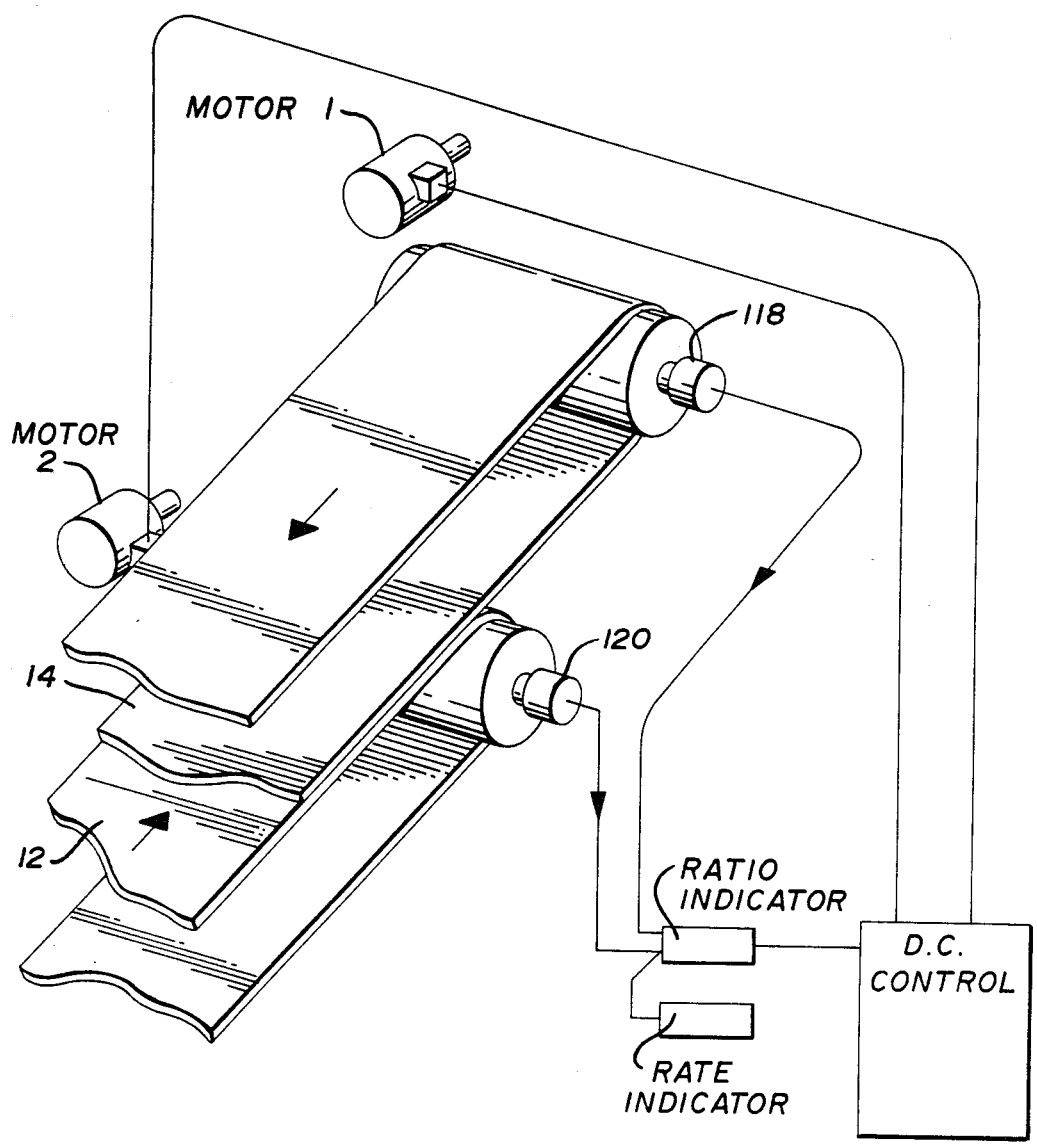
FIG. 7 is an electrical schematic illustration of the automatic speed/tension proportioning assembly.

An electrical diagram is shown in FIG. 7 for proportioning the torques of the conveyor belt 12 and cover belt 14 and for insuring the conveyor speed of the upper cover belt, which is the slave belt, with respect to the lower conveyor belt, which is the master belt. For each belt 12,14 the tension increase from the tail to the head pulleys and is proportional to the relative stiffness of each of the belts. As can be understood, the optimum condition would be to have the belts 12,14 and material being conveyed moving at a constant speed. To effect this objective, belt speed sensors 118 and 120 are employed with their rotatable axes to rotate with the two head pulleys 16 and 50 for independently determining the speed of motion of each belt. This information is fed into a microprocessor of the Ratio to Indicator to integrate the information and determine these speeds absolutely and one with respect to the other. The information in the Ratio Indicator during conditions where the belt speeds are different will send the signal to the DC controller to connect the electrical power to drive sharing circuitry, the electrical controls controlling the speed of motion to the motors M1 and M2 which drive the belts through the head idlers. This action functions to increase or decrease the speeds of the upper cover or slave belt to bring its speed into synchronization with the conveyor or master belt 12. A rate indicator is also driven off the Ratio Indicator to give a visual reading of the rate of speed of the conveyor belt 12 with respect to the speed of the drive motor to give an indication of efficiency of the system. Similarly, we may have a visual readout at the Ratio Indicator of the ratio of the cover belt 14 speed with respect to the conveyor belt 12. Although a 1:1 is desired, a preselected variation may be acceptable. The variation in the acceptable ratio may be modified by adjusting the potentiometer in the Ratio Indicator circuitry.

FULLY EQUALIZED PRESSURE DEVICES

Appropriate hugging pressure is provided to the upper portion of the hugging or cover belt 14 in the linear path through a fully equalized hugging or pressure device 124 which will distribute the hugging pressure to the cover belt only to the extent required and will distribute that pressure evenly and continuously across the conveyor belt cross section and along the entire conveyor length of the lifting zone 40. The effectiveness of this hugging or pressure device 124 is in distributing the load, reducing load concentration and providing continuous hugging pressure along the conveyor belt 12 in its straight line lifting zone 40 for further increased tension of the hugging and carrying belts 12,14 with respect to the conveyed material.

Each of the devices 124 includes eight pressing rollers 126, four on either side of the loading beam 130 on which they are supported. The pressing rollers 126 are each provided with rectangular carriers 132, opens at the top and bottom. Shafts 134 support each of the rollers 126 for rotational movement during operation. The ends of each shaft 134 are mounted in holes provided in the sides of the carriers. The front and back of each of the carriers 132 has, integral therewith, shafts 136 mounted in apertures within primary supporting equalizer brackets 138 so as to permit rotation of the carriers about axes perpendicular to the axes of rotation of the rollers 126. Two primary supporting equalizer brackets 138 are in turn mounted for rotation upon secondary supporting equalizer brackets 140 which are in turn mounted for rotation on the loading beam 130. One row of the rollers 126 is supported by a pair of the secondary supporting equalizer brackets 140 and constitutes a section 142 while the plurality of sections, two as disclosed herein, constitute a single module 144.

An equal number of rollers 126 are located on either side of the central line of a spring 146 and support for applying even and equal pressing forces to the cover belt 14. Note FIG. 10. Also, each row of rollers 126 is arranged and dimensioned whereby each section 142 of rollers will be located centrally along the path of belt movement with respect to the troughed assemblies 36 on the opposite side of the conveyor belt 12. Note FIG. 9.

The spacing of the pressing roll sections 142 along the conveyor length is preferably equal to the spacing of the troughed assemblies 36 but the location is staggered so that the pressing roll sections are located at or near the mid-span of the successive troughed assemblies. Each pressing roll section 142 consists of even numbers, preferably four, fully equalized pressing rollers 126. The number and type of pressing rollers 126 will be determined by the belt width, belt speed, type of materials handled, type of installation of mines, power plant, transfer terminal, etc.

Each of the pressing rollers 126 in any embodiment preferably consists of a standard steel idler roll, rubber disc impact rolls, special pneumatic or foam-filled, wide rubber tire rolls, etc. in a pivoting bracket as shown in the Figures. Pivoting bracket pins are located to achieve the desired roller load distribution. Typically, but not always, their optimal location will be at mid-span.

An odd number, preferably three, of equalizer brackets 138 and 140 are required per section 142 according to the number of pressing rollers 126 in the arrangement, four as shown. One of the pivoting cruciform axles 152 or shafts 134 is located for each of the rollers 126 to achieve the desired load distribution between adjacent rollers.

Thus each of the individual rollers 126 is freely rotatable about one of the shafts 134 mounted in one of the rectangular carriers 132. Each of the rectangular carriers 132 in turn is freely rotatable in the direction of belt movement about one of the shafts 136 mounted in the various equalizer brackets 138 and 140. Therefore, each of the rollers 126 is virtually universally free to move into optimum conformance with the moving cover belt 14 with the equalizer brackets 138 and 140 providing the appropriate force distributions thereto.

Figure 8:
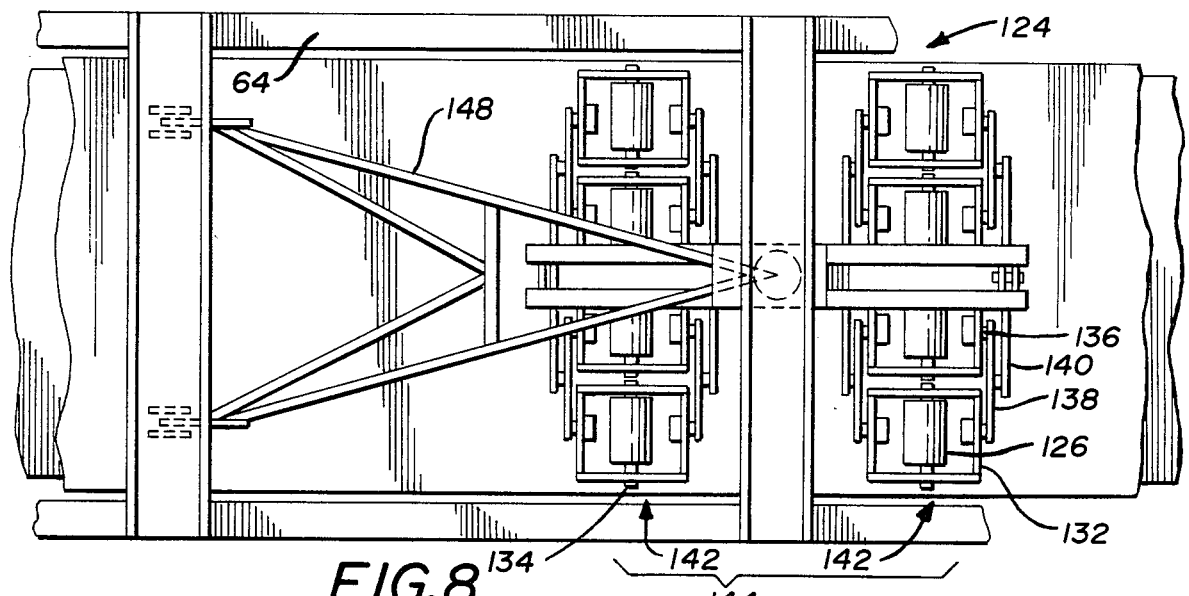
FIGS. 8 to 10 are side and front elevational views of the fully equalized pressure device shown in FIGS. 1, 2 and 4.
Figure 9:
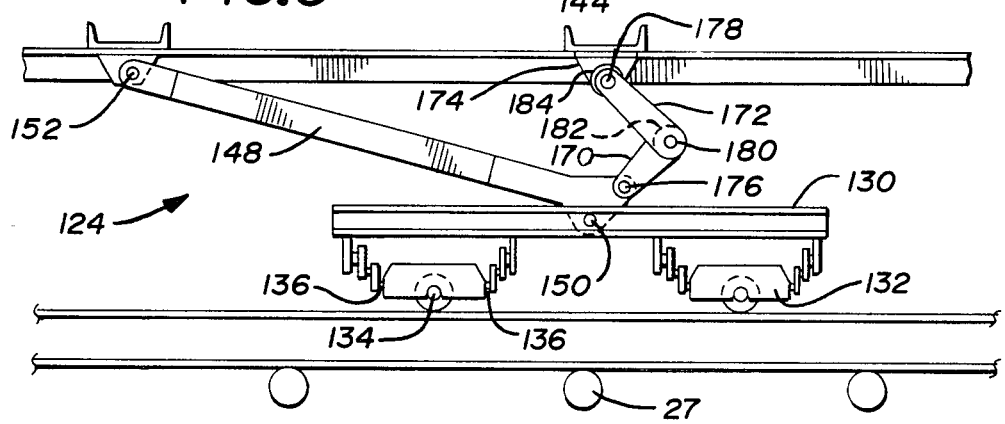
Figure 10:
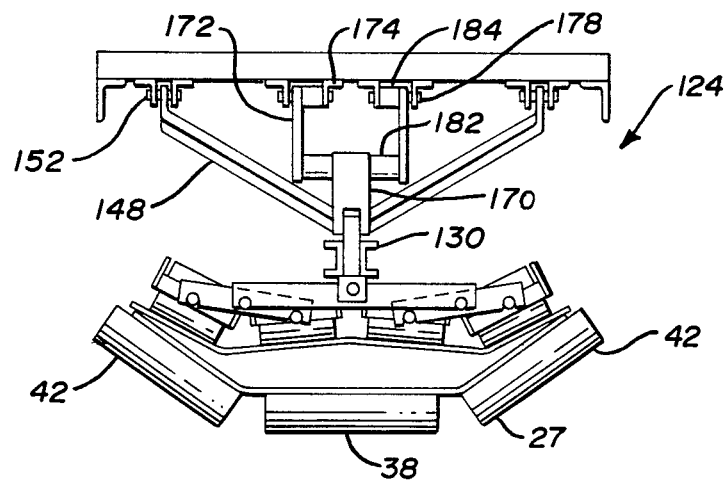

A loading beam 130 may typically tie together two sections 142 of the pressing rollers 126 to form one pressing module 144. The loading beam 130 is illustrated in FIGS. 8 to 10.

The assembly and disassembly of the fully equalized pressure device 124 including the pressing rollers 126 is facilitated by the use of slotted steel bushings 156 throughout to receive the various shafts and with slots to fit snugly into wedge-type receiving slots. Note FIG. 11. Additional bearings or bushings of self-lubricating materials such as bronze, nylon, ultra-high molecular weight polymers, graphite, or the like may be used in combination with the steel slotted bushings 156. The faces of the equalizer brackets 138,140 and loading beam 130 are shaped with the wedge shaped or conveying slots to accommodate the pivot pin shafts and bushings. The slotted bushings 156 may be of self-lubricating materials or may be of steel or other high friction material with an additional bushing or bearing to facilitate easy rotation of the pivot pin. Further alternatives to the fully equalized hugging pressure device 124 are also possible.

Support and pressure are provided to the rollers of the module through the framing members 64 of the conveyor immediately above the center of the loading beam 130. The other point of support is from a remote portion of an A-frame support 148 through a pivoting arm mounted to the framing members 64 at pivot point 150 and extending downstream where it is also mounted, at pivot point 152, to the loading beam 130. As shown in FIGS. 8, 9 and 10, the modules are mounted for movement as a whole relative to the framing member 64.

Shown in the figures is the specific assembly for applying pressure to the rollers 126 of the fully equalized hugging pressure device. This assembly comprises the use of a torsion spring, similar to that used in some vehicle suspensions, as for example, the Torsilastic spring manufactured by the B. F. Goodrich Company.

A linkage arrangement comprising lower link 170 and upper link 172 couple brackets 174 on the frame above the loading beam 130 through shafts 176 and 178, respectively. A pivot pin 180 joins the two links.

The spring 182 resiliently couples the upper and lower links together to bias the lower link 170 downwardly to apply an even pressure to the loading beam 130. Preferably an additional torsion spring 184, or more accurately, a pair of torsion springs acting together, couple brackets 174 on the framing member 164 to the top of the upper link 172. Torsion from the springs 182 and 184 will be transferred to apply pressure to the cover belt 14 of the sandwich conveyor through links 172, the loading beam 130, brackets 138,140, and the rollers 126. This arrangement will equalize the pressure to the assembly in a manner as described above. The A-frame support 148 pivoted to the framing member 164 of the machine and to the loading beam 130 adds stability to the assembly. Superior performance occurs because of the shock dampening capabilities of the torsion springs 182 and 184.

The pressure device 124 is thus designed to contact the back side of the cover belt 14 along a line transverse to belt movement as much as possible for maximum pressure equalization. Preferably the major portion of such line is contacted by the rollers.

ENVIRONMENTS

Figure 11:
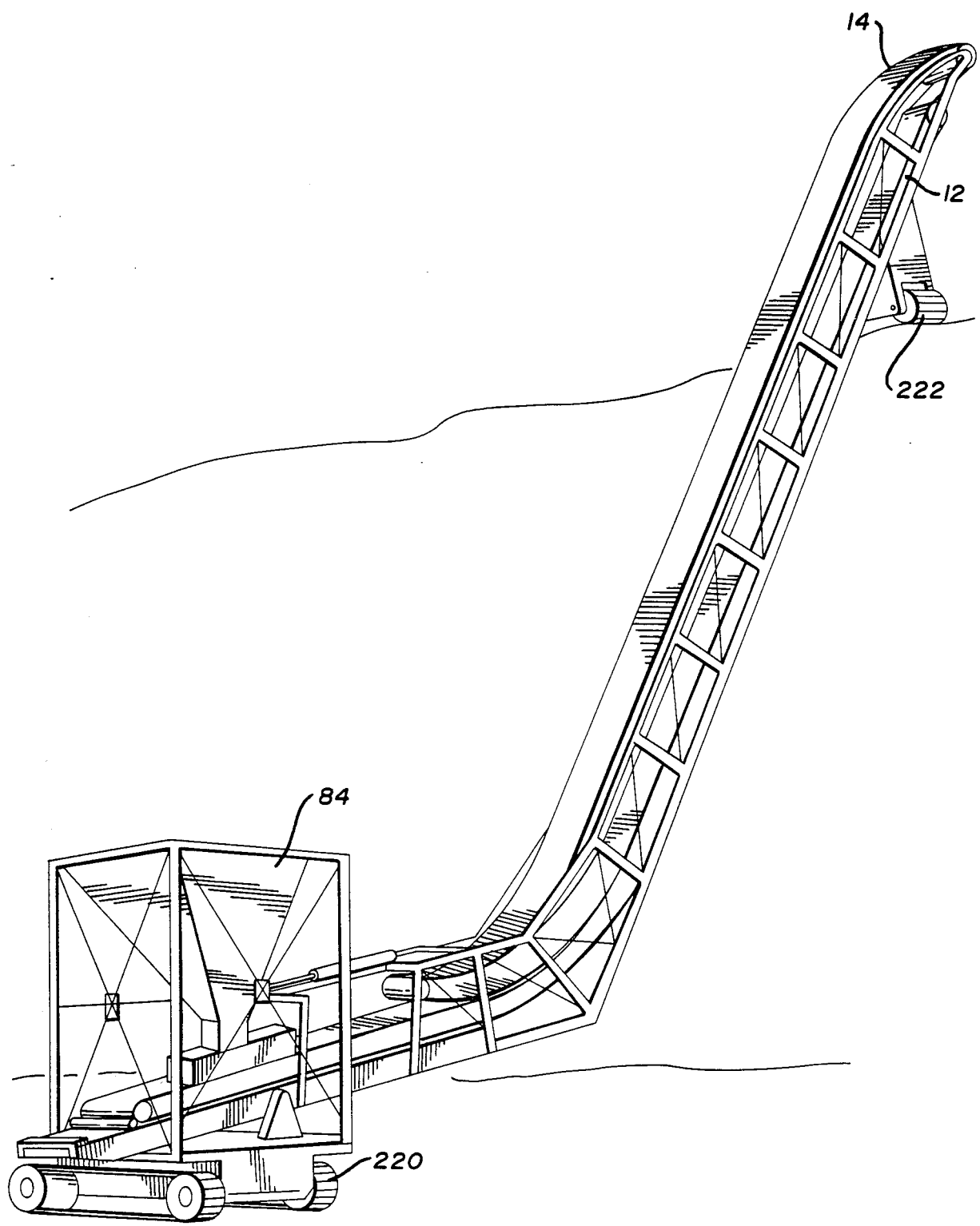
FIGS. 11 to 13 are perspective illustrations of various environments in which the subject high angle conveying apparatus may be utilized.

In utilizing the device of the instant invention on on-site locations, the actual support for the structure may be at its lower end with a bracing provided by the side of the hill being mined. Alternatively, this support for the high angle conveyor may be at the discharge station at the upper end of the high angle conveyor with the side of the mountain being mined providing support sufficient to hold the lower end in an appropriate orientation for receiving or to be conveyed. Yet further alternative is shown in FIG. 11 wherein both ends of the high angle conveyor apparatus 10 may be provided with motion-imparting caterpillar tracks or analogous motion-imparting means 220 and 222 for shifting the device at the mining side. Obviously merely one end or the other only could be so provided with such device shifting means depending on the configuration of the mine site.

Figure 12:
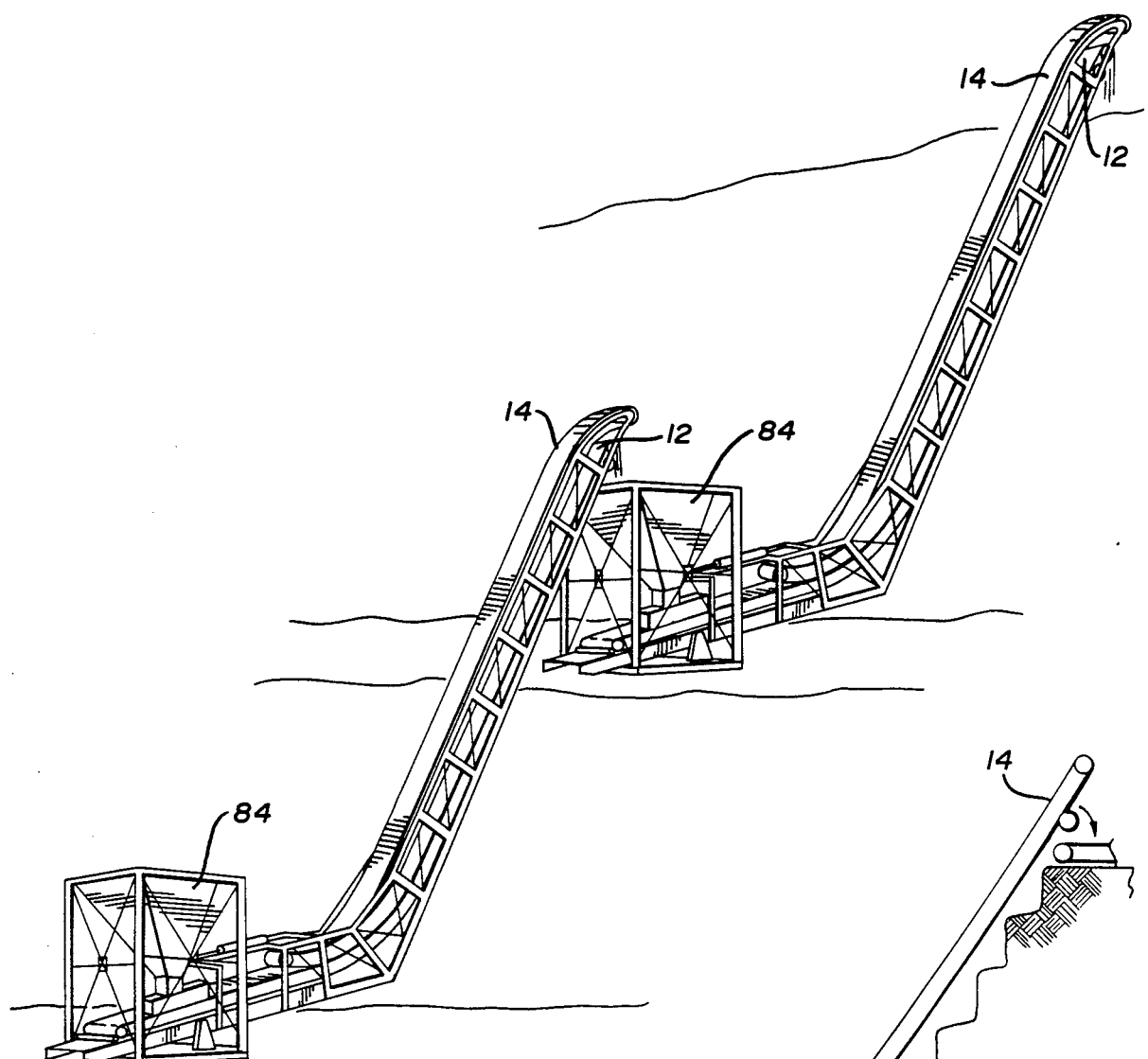

The FIG. 12 embodiment shows a plurality of high angle conveyors in a cascading or modular relationship with a lower angle conveyor apparatus 10 depositing its output at its upper end to the lower end of a further high angle conveyor apparatus. Ridges at the mining sites are normally provided during the mining function whereby pluralities or such high angle conveyors may be used together, the various high angle conveyors being of dissimilar length to achieve a particular objective.

STEEL CORD BELTS

Figure 13:
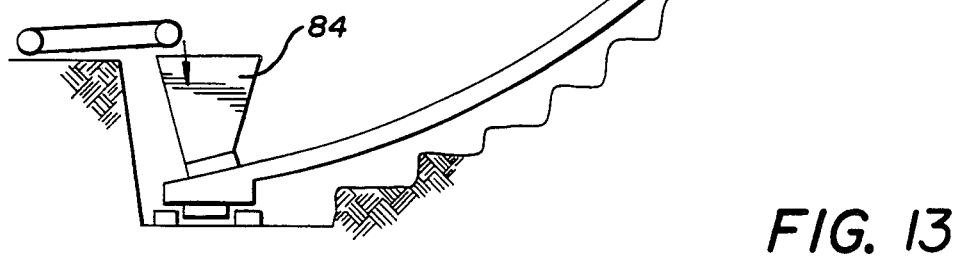

The last disclosed embodiment, that of FIG. 13, shows a curve with an enlarged radius of curvature at the curved transitional zone 34. This embodiment would be utilized where stronger steel cord conveyor belts were needed. Steel cord conveyor belts cannot conform to smaller radii of curvatures as disclosed in the primary embodiments of the earlier Figures and embodiments. As a result, the radius of curvature at the curved transitional zone 34 of this FIG. 13 embodiment would be in the nature of 500 to 1000 feet or beyond whereas the radius of curvature in the curved transitional zone of the primary embodiment with their cord belts would be 25 to 50 feet or beyond. Typical cords of the belts 12 and 14 of the prior embodiments would be of non-steel, as for example fabric, natural or synthetic, in a manner well known in the art.

CONCLUSION

While the present invention has been described in regard to a preferred primary embodiment and alternate embodiments it is not intended to be so limited but is intended to be covered broadly within the spirit and scope of the appended claims.

I claim:

1. For use in a high angle conveying apparatus having a conveyor belt and a cover belt supported on framing members trained for movement in endless configurations through a lifting zone whereat said belts are moved into operative association with each other so that material on said conveyor belt will be held in contact therewith by said cover belt, improved pressure means for applying essentially fully equalized pressure to the back surface of said cover belt including:
    (a) a module of rollers,
    (b) at least one row of rollers mounted within said module, each row of rollers positioned to contact the back surface of the cover belt along a line transverse to the direction of movement of the cover belt, each said row of rollers comprising a plurality of freely rotatable individual rollers contacting the cover belt across the major extent of the line across the cover belt, with each roller being on an individually moveable axis of rotation to permit conformance of each roller to the cover belt independent of its adjacent roller,
    (c) support means pivotally coupled at a first end to one of said framing members and at a second end to said module of rollers for movement of the module as a whole relative to said framing members.
    (d) link means coupled at a first end to one of said framing members of the conveying apparatus at a position adjacent said module of rollers and coupled at a second end to said support means, and a pivotable joint between said first and second ends; and
    (e) a torsion spring means coupling said joint to spring bias said link means to urge each said row of rollers into contact with the back surface of the cover belt for applying essentially fully equalized pressure thereto.

2. The pressure means as set forth in claim 1 and further including secondary torsion spring means coupling the first end of the link means to one of said framing members at a position adjacent the module of rollers.

* * * * *